United States Patent [19]

Seppälä et al.

[11] Patent Number: 5,227,355
[45] Date of Patent: Jul. 13, 1993

[54] STEREOSPECIFIC CATALYST SYSTEM INTENDED FOR THE POLYMERIZATION OF OLEFINS

[75] Inventors: Jukka Seppälä, Rantakiventie 18 as. 6, SF-00960 Helsinki; Mika Härkönen, Rasinkatu 14 C 105, SF-01360 Vantaa; Arvo Kulo, Iskostie 2 D 35, SF-01600 Vantaa, all of Finland

[73] Assignees: Jukka Seppälä; Mika Harkonen, both of Helsinki; Arvo Kulo, Vantaa, all of Finland

[21] Appl. No.: 808,693

[22] Filed: Dec. 17, 1991

[30] Foreign Application Priority Data

Dec. 20, 1990 [FI] Finland ........................... 906323

[51] Int. Cl.$^5$ ............................................. C08F 4/649
[52] U.S. Cl. ........................... 502/125; 502/127; 526/125; 526/128
[58] Field of Search ........................ 502/125, 127

[56] References Cited

U.S. PATENT DOCUMENTS

| | | | |
|---|---|---|---|
| 4,980,327 | 12/1990 | Barbe et al. | 502/125 X |
| 4,990,477 | 2/1991 | Kioka et al. | 502/125 X |
| 5,015,612 | 5/1991 | Kioka et al. | 502/125 X |

FOREIGN PATENT DOCUMENTS

| | | |
|---|---|---|
| 0258788 | 3/1988 | European Pat. Off. |
| 0267576 | 5/1988 | European Pat. Off. |
| 0282341 | 9/1988 | European Pat. Off. |
| 0288845 | 11/1988 | European Pat. Off. |
| 0356841 | 3/1990 | European Pat. Off. |
| 0379292 | 7/1990 | European Pat. Off. |

OTHER PUBLICATIONS

Makromolekulare Chemie., vol. 192, Dec. 1991, Basel CH pp. 2857–2863.

*Primary Examiner*—Patrick P. Garvin
*Attorney, Agent, or Firm*—Armstrong, Westerman, Hattori, McLeland & Naughton

[57] ABSTRACT

A good activity and stereospecifity have been achieved by a catalyst system intended for the polymerization of olefins comprising a procatalyst based on a titanium compound, an organoaluminium cocatalyst and an organosilane compound, the organosilane compound having the following formula (I)

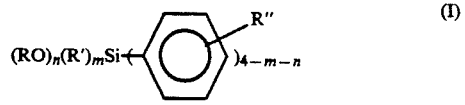

in which R is a lower alkyl, R' is an alkyl, R" is a substituent donating electrons, n=1, 2, or 3, m=0, 1, or 2, and n+m ≤ 3.

15 Claims, No Drawings

STEREOSPECIFIC CATALYST SYSTEM INTENDED FOR THE POLYMERIZATION OF OLEFINS

The present invention relates to a catalyst system intended for the polymerization of olefins comprising a procatalyst based on a titanium compound, an organoaluminium cocatalyst and an organosilane compound.

Generally, the Ziegler-Natta catalyst system is used for the polymerization of olefins, which system essentially consists of a so-called procatalyst and a cocatalyst. A procatalyst is a component which is based on a compound of a transition metal belonging to any of the groups IVA-VIII of the periodic table of elements (Hubbard, IUPAC 1970). A cocatalyst, on the other hand, is a component based on an organometallic compound of a metal belonging to any of the groups IA-III(A) of the periodic table of elements, (Hubbard, IUPAC 1970).

To the catalyst system usually also belongs electron donor compounds improving and modifying the catalytic properties. An inner donor is used as a part of the procatalyst to modify and improve its catalytic effect. An outer donor, on the other hand, is used together with the cocatalyst of procatalyst to improve, among other things, the stereospecifity of the catalyst system. Many outer donors of this kind improving the stereospecifity are known in the field.

EP patent specifications 231,878 and 261,961 disclose the preparation of a procatalyst from magnesium dichloride, diheptylphthalate and titanium tetrachloride, an alternative coating of the procatalyst composition obtained with a propylene prepolymer and using the procatalyst obtained together with t-butylmethyl dimethoxysilane and triethylaluminium for the stereospecific polymerization of the propylene. EP patent specification 045,977 discloses the use of a procatalyst, formed of magnesium dichloride, titanium tetrachloride and an inner donor, together with triethylaluminium and phenyl triethoxysilane for the polymerization of the propylene. EP patent specification 267,576 discloses the use of a procatalyst of the same type together with an alkyl- phenyl- or tolylmethoxy- or -ethoxy silane and an organoaluminium compound for the polymerization of olefins.

The patent specifications EP 250,229, DE 3,644,368, U.S. Pat. No. 4,710,482, JP 63-182,306 and JP-63-37104 also represent the same type of technology.

The aim of the present invention is to achieve a new catalyst system intended for the polymerization of olefins which is better than previously suitable for the preparation of stereospecific polymers. Simultaneously, the highest possible activity of the catalyst is aimed at. These goals have now been achieved by the new catalyst system intended for the polymerization of olefins, characterizing of which mainly is what has been related in the characterizing clause of claim 1.

Thus, it has been realized that the better stereoselectivity and activity than previously has been achieved by an outer organosilane donor having the following formula I

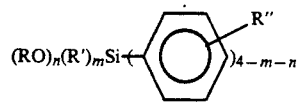

in which R is a lower alkyl, R' is alkyl, R" is a electron donating substituent, n=1, 2, or 3, m=0, 1, or 2, and n+m≦3. The aromatic substituent R" in the formula is, according to one embodiment, a branched alkyl group and preferably a tertiary butyl group. According to another embodiment R" is a phenyl group. According to a third embodiment group R" is a phenoxy

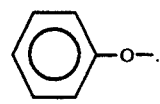

It has also been noted that the organosilane compound in question is a particularly good outer donor, if the group R" is in the para-position of the benzene ring.

The symbol n of the formula I is preferably 2 or 3 and still more preferably 2. The symbol m is preferably either 1 or 2. The sum m+n is preferably 3.

When more than one substituent type shown by the formula (n, m and/or 4-m-n≧1) has been attached to the silicon atom of the formula I, the groups R, R' and R" in question can be either of different kind or similar. As far as the efficiency of the outer electron donor is concerned it is advantageous if the substituent of the organosilane compound R is ethyl or methyl, preferably methyl.

Particularly preferable organosilane compounds that can be used as outer donors are 4-t-butylphenyl trimethoxysilane:

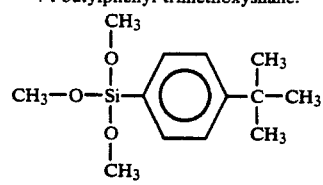

di(4-t-butylphenyl) dimethoxysilane:

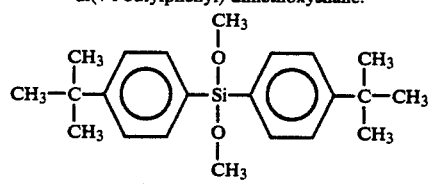

biphenyl trimethoxysilane:

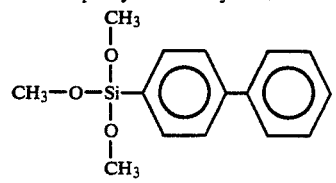

methyl(phenoxyphenyl) dimethoxysilane:

-continued

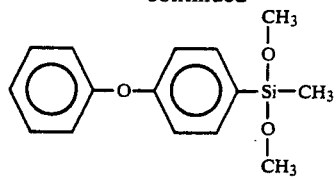

V

As mentioned above the catalyst system according to the present invention comprises a procatalyst based on a titanium compound, an organoaluminium cocatalyst and an organosilane compound.

The procatalyst component used in the invention usually is a titanium compound supported by a solid magnesium compound insoluble in hydrocarbon, to which may still be attached an inner electron donor. Such procatalysts are usually formed by bringing a compound of 4 valent titanium, an organic inner electron donor and a magnesium compound to react with each other.

Suitable magnesium containing compounds are magnesium halides, reaction products of magnesium halide and an organic or metalorganic compound, magnesium alcoholates or magnesium alkyls. The most preferable magnesium compound is magnesium dichloride.

Titanium compounds usable in the present invention are halides and alkoxy halides of 4 valent titanium, the alcoholate groups having from about 1 to about 20 carbon atoms. Most preferable are the titanium tetrahalides and particularly titanium tetrachloride.

Suitable inner donors to be used in the procatalyst are organic compounds containing one or more oxygen, nitrogen, sulphur or phosphorus atoms. Accordingly, the electron donor can be selected from the group comprising aliphatic or aromatic carboxylic acids, aliphatic or aromatic alkyl esters of carboxylic acids, ethers, aliphatic or aromatic ketones, aliphatic or aromatic aldehydes, aliphatic and aromatic alcohols, aliphatic and aromatic acid halides, aliphatic and aromatic nitriles, aliphatic and aromatic amines as well as aromatic phosphines.

As cocatalyst can be used any organometallic compound of a metal belonging to any of the groups IA-III(A) of the periodic table of elements. Typical metals are magnesium, zinc, and aluminium, the last-mentioned of which being the most preferable. Most preferable are the trialkyl aluminiums, such as triethylaluminium.

In the following we present some examples for the illustration of the invention.

EXAMPLE 1

The organoaluminium compound triethyl aluminium and an outer donor, 4-t-butylphenyl trimethoxysilane (II), were mixed into 20 ml of dried heptane, the Al:donor molar ratio being 10. After 8 minutes 25 mg of a solid procatalyst was added to the mixture, whereby the Al:Ti molar ratio became 200. The procatalyst, the titanium content of which was 2.6% by weight, had been prepared according to Example 1 of the patent FI-80055. Next the catalyst was transferred to a one-liter nitrified polymerization reactor prepared of stainless steel, after which hydrogen was added to the reactor so that the partial pressure became 0.3 bar. After this 300 g of liquid propylene was conducted to the reactor. The temperature was maintained at 10° C. for five minutes for the prepolymerization of the catalyst, after which the temperature was raised to the polymerization temperature 60° C. The polymerization time was 45 minutes.

The activity of the catalyst was 7.6 kg of polypropylene/g of catalyst in one hour. The polypropylene obtained had a round form and it was freely flowing, and its isotacticity was 96.4%, by which is meant the portion of polypropylene of the whole polymer amount that does not dissolve in the boiling heptane. The intrinsic viscosity of the polymer at 135° C., when the solvent was decaline, was 2.5 dl/g.

EXAMPLE 2

The polymerization was otherwise carried out as in Example 1, but biphenyl trimethoxysilane (VI) was used as the outer donor.

Hereby, the activity of the catalyst was 7.1 kg of polypropylene/g of catalyst in one hour. The isotacticity of the polymer was 96.5% and the intrinsic viscosity 2.41dl/g.

EXAMPLE 3

The polymerization was otherwise carried out as in Example 1, but di(biphenyl) dimethoxysilane was used as the outer donor.

Hereby, the activity of the catalyst was 7.0 kg of polypropylene/g of catalyst in one hour. The isotacticity of the polymer was 92.5% and the intrinsic viscosity 2.31 dl/g.

EXAMPLE 4

The polymerization was otherwise carried out as in Example 1, but methyl(phenoxyphenyl) dimethoxysilane (V) was used as the outer donor.

Hereby, the activity of the catalyst was 6.7 kg of polypropylene/g of catalyst in one hour. The isotacticity of the polymer was 98.3% and the intrinsic viscosity 2.67 dl/g.

A COMPARISON EXAMPLE

The polymerization was otherwise carried out as in Example 1, but as the outer donor was used methylphenyl diethoxysilane

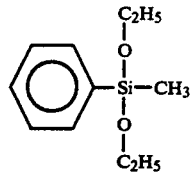

the structure of which otherwise corresponds to the outer donors of the present invention (cf. Example 4) except that the phenyl is not a substituted one.

Hereby, the activity of the catalyst was 5.9 kg of polypropylene/g of catalyst in one hour. The isotacticity of the polymer was 94.0% and the intrinsic viscosity 1.98 dl/g.

We claim:

1. A catalyst system for the polymerization of olefins comprising a procatalyst based on a titanium compound, an organoaluminium cocatalyst and an organosilane compound, wherein the organosilane compound has the formula

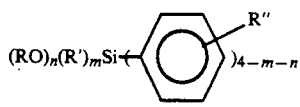

in which R is a lower alkyl group; R' is an alkyl group; R" is a branched alkyl, a phenyl or a phenoxy group; n=1, 2, or 3; m=0, 1, or 2; and n+m≦3.

2. A catalyst system according to claim 1, wherein R" is tertiary butyl.

3. A catalyst system according to claims 1 or 2, wherein R" is in the para position of the benzene ring.

4. A catalyst system according to claims 1 or 2, wherein n is 2 or 3.

5. A catalyst system according to claim 4, wherein n is 2.

6. A catalyst system according to claims 1 or 2, wherein m is 1 or 2.

7. A catalyst system according to claims 1 or 2, wherein R is methyl.

8. A catalyst system according to claims 1 or 2, wherein R' is a lower alkyl group.

9. A catalyst system according to claims 1 or 2, wherein the organosilane compound is 4-t-butylphenyl trimethoxysilane.

10. A catalyst system according to claim 1, wherein the organosilane compound is biphenyl trimethoxysilane.

11. A catalyst system according to claim 1, wherein the organosilane compound is a methyl(phenoxyphenyl) dimethoxysilane.

12. A catalyst system according to claims 1 or 2, wherein the procatalyst comprises a tetravalent titanium compound on a magnesium halide carrier.

13. A catalyst system according to claim 12, wherein the tetravalent titanium compound is $TiCl_4$ and the magnesium halide is $MgCl_2$.

14. A catalyst system according to claims 1 or 2, wherein the organoaluminium cocatalyst is a trialkyl aluminum.

15. A catalyst system according to claim 14, wherein the trialkyl aluminum is triethyl aluminum.

* * * * *

UNITED STATES PATENT AND TRADEMARK OFFICE
CERTIFICATE OF CORRECTION

PATENT NO.: 5,227,355
DATED : July 13, 1993
INVENTOR(S): Seppälä et al.

It is certified that error appears in the above-identified patent and that said Letters Patent is hereby corrected as shown below:

On the cover page, Item [73] Assignees: "Jukka Seppälä; Mika Harkonen, both of Helsinki; Arvo Kulo, Vantaa, all of Finland" should read --NESTE OY, Kulloo, Finland--.

Signed and Sealed this

Twenty-sixth Day of April, 1994

Attest:

BRUCE LEHMAN

Attesting Officer     Commissioner of Patents and Trademarks